United States Patent
Son et al.

(10) Patent No.: US 11,338,797 B2
(45) Date of Patent: May 24, 2022

(54) HYBRID VEHICLE AND ANTI-ROLLOVER CONTROL METHOD FOR THE SAME

(71) Applicants: Hyundai Motor Company, Seoul (KR); Kia Motors Corporation, Seoul (KR)

(72) Inventors: Hui Un Son, Suwon-si (KR); Sung Bae Jeon, Ansan-si (KR); Jin Kyeom Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 16/911,694

(22) Filed: Jun. 25, 2020

(65) Prior Publication Data
US 2021/0016770 A1    Jan. 21, 2021

(30) Foreign Application Priority Data
Jul. 15, 2019    (KR) .................. 10-2019-0084931

(51) Int. Cl.
| | |
|---|---|
| *B60W 30/04* | (2006.01) |
| *B60W 10/02* | (2006.01) |
| *B60W 10/06* | (2006.01) |
| *B60K 5/04* | (2006.01) |
| *B60W 50/14* | (2020.01) |
| *F02D 41/02* | (2006.01) |

(52) U.S. Cl.
CPC ............... *B60W 30/04* (2013.01); *B60K 5/04* (2013.01); *B60W 10/02* (2013.01); *B60W 10/06* (2013.01); *B60W 50/14* (2013.01); *F02D 41/021* (2013.01); *B60W 2030/043* (2013.01); *B60W 2050/146* (2013.01); *B60W 2510/0638* (2013.01); *B60W 2520/18* (2013.01); *B60W 2552/00* (2020.02); *F02D 2200/70* (2013.01)

(58) Field of Classification Search
CPC ...... B60W 10/02; B60W 10/06; B60W 30/04; B60W 2030/043; B60W 50/14; B60W 2552/00; B60W 2552/30; B60W 2050/146; B60W 2510/0638; B60W 2520/18; B60W 2710/021; B60W 2710/0661; B60W 2720/18; B60K 5/04; F02D 41/021; F02D 2200/70
See application file for complete search history.

(56) References Cited

U.S. PATENT DOCUMENTS

| | | | | |
|---|---|---|---|---|
| 2014/0277988 | A1* | 9/2014 | Franganillo ........... | B60W 10/02 701/93 |
| 2016/0059696 | A1* | 3/2016 | Quehenberger ....... | B60K 23/08 701/56 |
| 2017/0327109 | A1* | 11/2017 | Watanabe .............. | B60T 8/321 |

FOREIGN PATENT DOCUMENTS

| | | | | |
|---|---|---|---|---|
| CN | 106715212 | A  * | 5/2017 | ............. F02D 29/02 |
| JP | 2001347910 | A  * | 12/2001 | |

(Continued)

*Primary Examiner* — Edwin A Young
(74) *Attorney, Agent, or Firm* — Morgan, Lewis & Bockius LLP

(57) ABSTRACT

A hybrid vehicle for anti-rollover through active control of an engine and an anti-rollover control method for the same, may include detecting a roll angle of the vehicle, and when the detected roll angle is equal to or greater than a threshold roll angle, accelerating or decelerating, by a controller, the engine in a state in which the engine clutch is released depending on a direction of the roll angle.

20 Claims, 14 Drawing Sheets

(56) References Cited

FOREIGN PATENT DOCUMENTS

JP    2001347911 A  *  12/2001
JP    2010084861 A  *  4/2010

* cited by examiner

HYBRID VEHICLE AND ANTI-ROLLOVER CONTROL METHOD FOR THE SAME

The present application claims priority to Korean Patent Application No. 10-2019-0084931, filed on Jul. 15, 2019, the entire contents of which is incorporated herein for all purposes by this reference.

BACKGROUND OF THE INVENTION

Field of the Invention

The present invention relates to a hybrid vehicle for anti-rollover through active control of an engine and an anti-rollover control method for the same.

Description of Related Art

Rollover refers to a phenomenon in that a vehicle overturns in a lateral direction, and in a broad sense, is a phenomenon in that a roll angle as an angle between an axle of a vehicle and the ground is equal to or greater than a predetermined level. This is a main cause of a serious vehicle accident and is caused when a vehicle enters a curved road at a high speed or travels on an irregular road. Physical interpretation of such rollover will be described with reference to FIG. 1.

FIG. 1A, FIG. 1B, FIG. 1C, and FIG. 1D are diagrams for explaining rollover that occurs in a general vehicle.

In detail, FIG. 1A is a graph showing a relationship between a roll angle and an acceleration, and FIGS. 1B to 1D show states of points of the graph of FIG. 1A. In FIG. 1, for convenience of description, inclination of a vehicle body based on an operation of a suspension is disregarded and an axle of the vehicle is assumed to be always parallel to the vehicle body.

First, in the graph shown in FIG. 1A, the horizontal axis is a roll angle $\Phi$ and the vertical axis is a ratio (hereinafter, for convenience of description, referred to as a "lateral acceleration ratio") of a lateral acceleration $a_y$ to gravitational acceleration g applied to the vehicle.

Rollover begins when a lateral acceleration equal to or greater than a rollover threshold is generated and a vehicle is naturally restored through a relationship between the center of gravity of a vehicle and a roll angle of the vehicle, but when a roll angle exceeds a predetermined level, it may be possible to restore the vehicle only when a lateral acceleration in an opposite direction is applied to the vehicle.

For example, as shown in FIG. 1A, a roll angle is barely generated in a lateral acceleration ratio smaller than a rollover threshold 11, and thus, a vehicle may be in a state shown in FIG. 1B. Here, force $F_l$ applied to a left wheel 21 of a vehicle 20 from the ground and force $F_r$ applied to a right wheel 22 from the ground may correspond to reaction to a load applied to the ground from each wheel and may action as force for preventing rollover of the vehicle. Assuming that a lateral acceleration is generated in a right direction, for example, a vehicle turns to the left, the vehicle is rotated based on a right wheel 12, and thus, the rotation center may be a point of the right wheel 12, which contacts with the ground, and a rotation equation with the point as a rotation axis may be represented using Equation 1 below.

$$Ma_y h - Mg\frac{t}{2} + F_l t = 0 \quad \text{[Equation 1]}$$

In Equation 1 above, M is a mass of a vehicle, t is a track width, and h is a height to the center of gravity (cm) from the group. Since a moment at which rotation occurs may be a moment with $F_l=0$, and in the instant case, a lateral acceleration may be a value (i.e., t/2h) obtained by dividing the track width t by twice of the height h to the center of gravity (cm) from the ground. That is, the rollover threshold 11 of the lateral acceleration ratio in which a roll angle begins to be formed may be "t/2h".

Accordingly, when roll begins to occur (12) and a torque for rotating a vehicle in a clockwise direction by a lateral acceleration is maintained, a vehicle may be in a state shown in FIG. 1C and a torque for rotating the vehicle in a counterclockwise direction by gravity may be reduced. Thus, when a lateral acceleration is maintained, a roll angle of the vehicle may be continuously increased.

Accordingly, as shown in FIG. 1D, force for rotation by gravity disappear from a moment 13 at which the center of gravity (cm) and the rotation center cr are vertically aligned with each other. Thus, even if a lateral acceleration is 0, the vehicle may be balanced in a state in which a threshold roll angle $$\phi = \tan^{-1}\frac{t}{2h}$$

is maintained, and when an even slight lateral acceleration is applied in a right direction thereof, the vehicle 20 may be in a "rollover" state in a general sense, and a lateral acceleration in a left direction may be required to restore the vehicle in the present state.

However, in a general vehicle, it is difficult to generate a lateral acceleration in a left direction through control as long as there is no other external force such as help of a road surface in the state shown in FIG. 1D. Accordingly, various researches have been conducted to alleviate rollover before a vehicle becomes in a state in which the vehicle may rollover. An example of the research includes a rollover mitigation (ROM) function, a stabilizer, or an active roll stabilizer (ARS).

First, the rollover mitigation (ROM) function refers to a function of alleviating rollover by controlling brake force or driving force when a risk of rollover due to a roll behavior of a vehicle is detected. The stabilizer refers to a torsion bar used to reduce occurrence of roll of a vehicle body when wheels at respective sides are moved in different up and down directions. The active roll stabilizer (ARS) refers to a device configured for actively controlling the rigidity of a torsion bar when a motor is disposed in a motor and a vehicle turns.

However, the rollover mitigation (ROM) function deals with a change in roll angle only before the roll angle exceeds the aforementioned threshold roll angle $$\phi = \tan^{-1}\frac{t}{2h},$$

and a stabilizer system requires additional hardware, and thus, there is a problem in that vehicle prices are increased and a vehicle weight is increased.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a hybrid vehicle for anti-rollover and a control method thereof.

The present invention is directed to a hybrid vehicle for anti-rollover through engine control and a control method thereof.

The technical problems solved by the exemplary embodiments are not limited to the above technical problems and other technical problems which are not described herein will become apparent to those skilled in the art from the following description.

To achieve these objects and other advantages and in accordance with the present invention, as embodied and broadly described herein, a method of controlling a hybrid vehicle in which an engine clutch is mounted between an engine and a driving motor includes detecting a roll angle of the vehicle, and when the detected roll angle is equal to or greater than a threshold roll angle, accelerating or decelerating, by a controller, the engine in a state in which the engine clutch is released depending on a direction of the roll angle.

In another aspect of the present invention, a hybrid vehicle includes an engine controller configured to control an engine, a clutch controller configured to control an engine clutch mounted between the engine and a driving motor, and a hybrid controller electrically connected to the engine controller and the clutch controller and configured to control the engine controller and the clutch controller, wherein the hybrid controller detects a roll angle of the vehicle, and when the detected roll angle is equal to or greater than a threshold roll angle, the hybrid controller controls the engine clutch in the state in which the engine clutch is released depending on a direction of the roll angle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The accompanying drawings, which are included to provide a further understanding of the present invention and are incorporated in and form a portion of the present application, illustrate embodiment(s) of the present invention and together with the description are configured to explain the principle of the present invention. In the drawings.

Figure 1A:
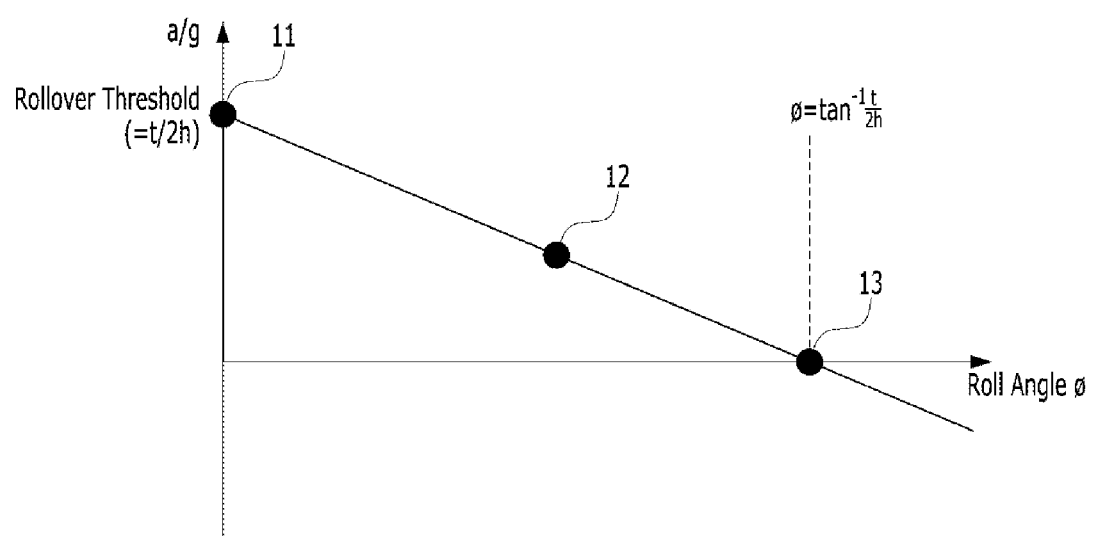
FIG. 1A, FIG. 1B, FIG. 1C, and FIG. 1D are diagrams for explaining rollover that occurs in a general vehicle.
Figure 1B:
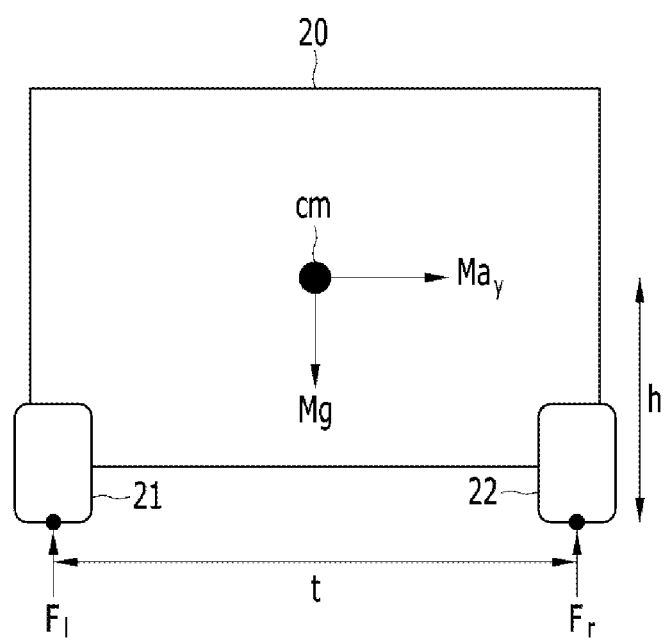
Figure 1C:
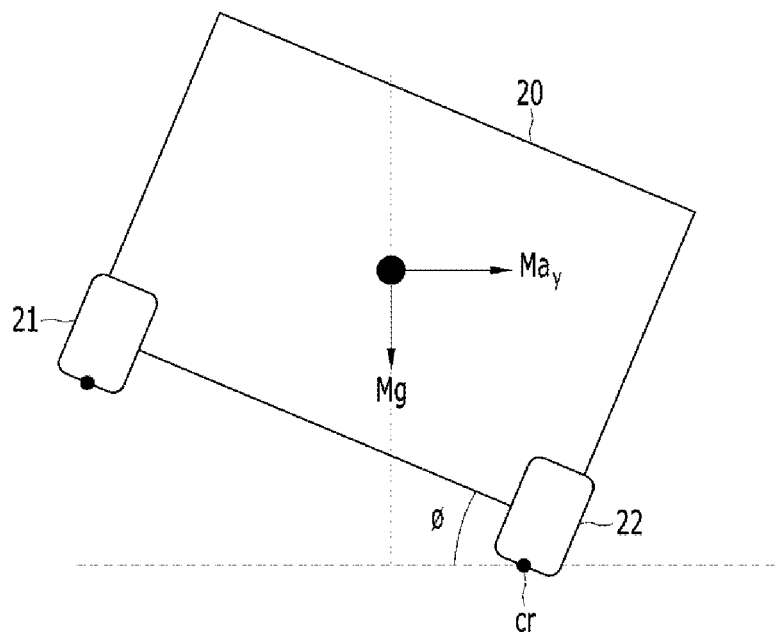

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the exemplary embodiments of the present invention will be described in detail with reference to the accompanying drawings to be easily implemented by those skilled in the art. However, the present invention may be variously implemented and is not limited to the exemplary embodiments described herein. In the drawings, to clearly describe the present invention, portions which are not related to the description of the present invention will be omitted and similar portions are denoted by similar reference numerals throughout the specification.

Throughout the specification, when a certain portion "includes" a certain component, this indicates that the other components are not excluded, but may be further included unless specially described. The same reference numbers will be used throughout the drawings to refer to the same or like parts.

According to exemplary embodiments of the present invention, a vehicle for anti-rollover control is assumed to be a hybrid vehicle. Thus, prior to a description of an anti-rollover control according the exemplary embodiments of the present invention, a structure and control system of a hybrid vehicle will be described with reference to FIG. 2 and FIG. 3.

In general, a hybrid electric vehicle (HEV) refers to a vehicle that utilizes two power sources that mainly include an engine and an electric motor. An HEV has excellent fuel efficiency and engine performance compared with a vehicle including only an internal combustion engine and is also advantageous for lowering emissions, and thus, has been actively developed recently.

Such a hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode of operating both an electric motor and an engine to acquire power. A hybrid vehicle switches between the two modes according to driving conditions.

Such switch between driving modes is performed to maximize fuel consumption or driving efficiency depending on the efficiency characteristics of a powertrain.

First, a structure of a hybrid vehicle will be described with reference to FIG. 2.

Figure 2:
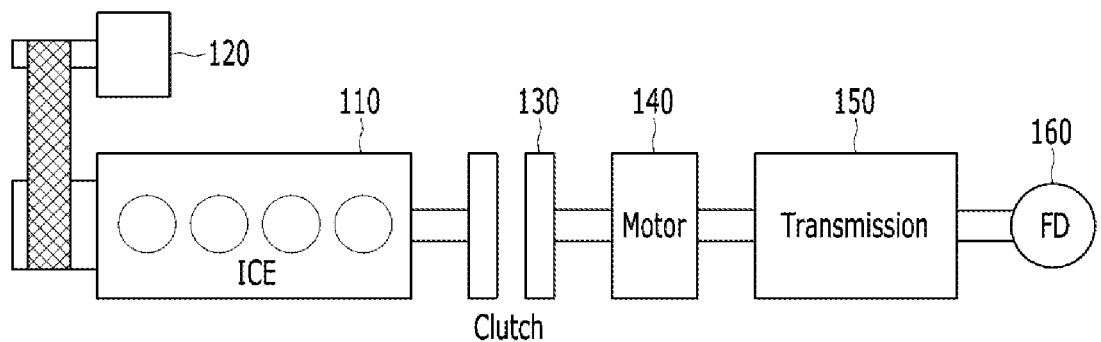
FIG. 2 is a diagram illustrating an example of a powertrain structure of a parallel type hybrid vehicle applicable to embodiments of the present invention.

FIG. 2 is a diagram illustrating an example of a powertrain structure of a parallel type hybrid vehicle applicable to embodiments of the present invention.

FIG. 2 shows a powertrain of a hybrid vehicle employing a parallel type hybrid system including an electric motor 140 (or a driving motor) and an engine clutch 130 that are mounted between an internal combustion engine (ICE) 110 and a transmission 150.

In such a vehicle, in general, when a driver presses an accelerator after turning on the vehicle, the motor 140 is driven using power of a battery while the engine clutch 130 is opened and transmits power to move wheels through the transmission 150 and a final drive (FD) 160 (i.e., EV mode). As the vehicle gradually accelerates, high driving force is further required, and in the instant case, an auxiliary motor (or a starter generator motor 120) may be operated to drive the engine 110.

Accordingly, when rotation speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is opened and the engine 110 stops (i.e., transition to an EV mode from an HEV mode). Furthermore, a hybrid vehicle charges a battery by converting driving force of a wheel into electrical energy, which is referred to as braking energy regeneration or regenerative braking.

The starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG), and depending on the cases, may be referred to as an "auxiliary motor".

A driving mode of a hybrid vehicle will be described below in detail based on the aforementioned structure.

An EV mode is mainly used in a situation in which a vehicle speed is low and required torque is low, and in the EV mode, the engine clutch 130 may be opened and a torque may be transferred to a wheel using only the motor 140 as a power source.

An HEV mode is mainly used in a situation in which a vehicle speed is high and required torque is high, utilizes the engine 110 and the motor 140 as a power source, and may be subdivided into an HEV series mode and a HEV parallel mode. In the HEV series mode, the engine clutch 130 may be opened, power of the engine 110 may be used in generation of the HSG 120, and only the motor 140 may directly generate driving force. In contrast, in the HEV parallel mode, the engine clutch 130 may be locked to transfer both driving force of the engine 110 and driving force of the motor 140 to a wheel.

Figure 3:
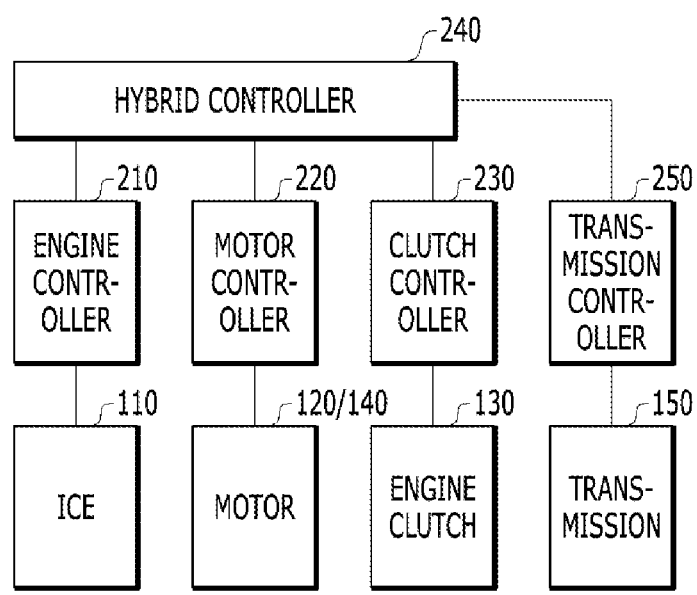
FIG. 3 is a block diagram showing an example of a control system of a hybrid vehicle to which embodiments of the present invention are applicable.

FIG. 3 is a block diagram showing an example of a control system of a hybrid vehicle to which embodiments of the present invention are applicable.

Referring to FIG. 3, in the hybrid vehicle to which embodiments of the present invention are applicable, the internal combustion engine 110 may be controlled by an engine controller 210, torque of the starter generator motor 120 and the motor 140 may be controlled by a motor control unit (MCU) 220, and the engine clutch 130 may be controlled by a clutch controller 230. Here, the engine controller 210 may also be referred to as an engine management system (EMS). Furthermore, the transmission 150 may be controlled by a transmission controller 250. Depending on the cases, the starter generator motor 120 and the motor 140 may be controlled by different separate motor controllers.

Each controller may be connected to a hybrid controller unit (HCU) 240 for controlling an overall operation of a powertrain as a high-level controller in a hybrid vehicle and may provide information required to switch driving modes and to control an engine clutch during gear transmission, and/or information required to control engine off to the HCU 240 or may perform an operation according to a control signal under control of the HCU 240.

In more detail, the HCU 240 may determine whether a mode is switched depending on a driving state of a vehicle. For example, the hybrid controller may be configured to determine an open time of the engine clutch (EC) 130 and may control hydraulic pressure (in the case of a wet EC) or control torque capacity (in the case of a dry EC) when the EC is opened. The HCU 240 may determine an EC state (lock-up, slip, open, etc.) and may control a time for stop of fuel injection of the engine 110. The hybrid controller may transmit a torque command for control of torque of the starter generator motor 120 to the MCU 220 and may control engine rotational energy recovery. Furthermore, the HCU 240 may control a low-level controller configured for determining and switching a mode when driving mode switch is controlled.

Needless to say, it would be obvious to one of ordinary skill in the art that the aforementioned relationship between the controllers and functions/divisions of the controllers are exemplary, and thus, are not limited to the terms. For example, the HCU 240 may be embodied by allowing any one of other controllers except for the HCU 240 to provide a corresponding function or two or more of other controllers may distribute and provide the corresponding function.

The aforementioned configuration of FIG. 3 is merely an example of a configuration of a hybrid vehicle, and it is obvious to one of ordinary skill in the art that a hybrid vehicle applicable to embodiments of the present invention is not limited to the present configuration.

Hereinafter, an anti-rollover control method according to embodiment of the present invention will be described based on the aforementioned configuration of the hybrid vehicle.

Figure 4:
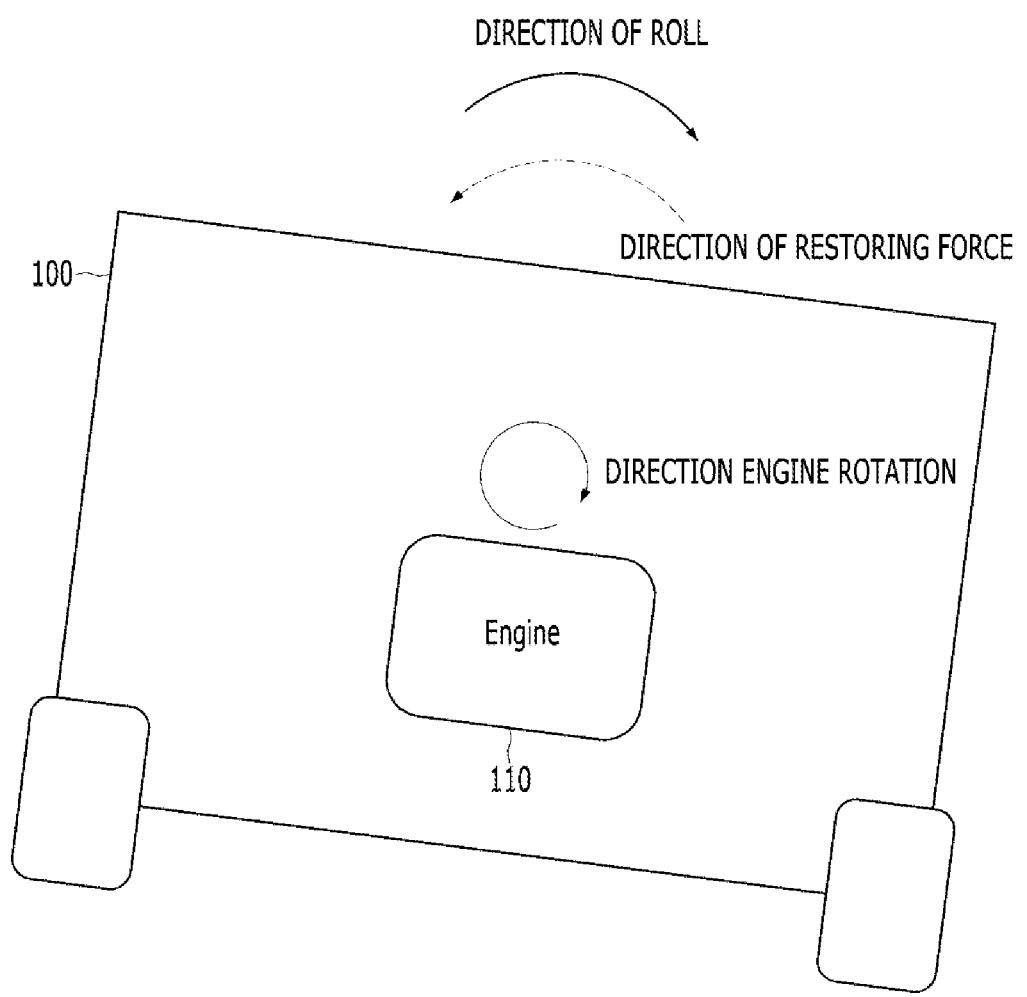
FIG. 4 is a diagram for explaining a principle of anti-rollover control according to an exemplary embodiment of the present invention.

FIG. 4 is a diagram for explaining a principle of anti-rollover control according to an exemplary embodiment of the present invention.

Figure 1D:
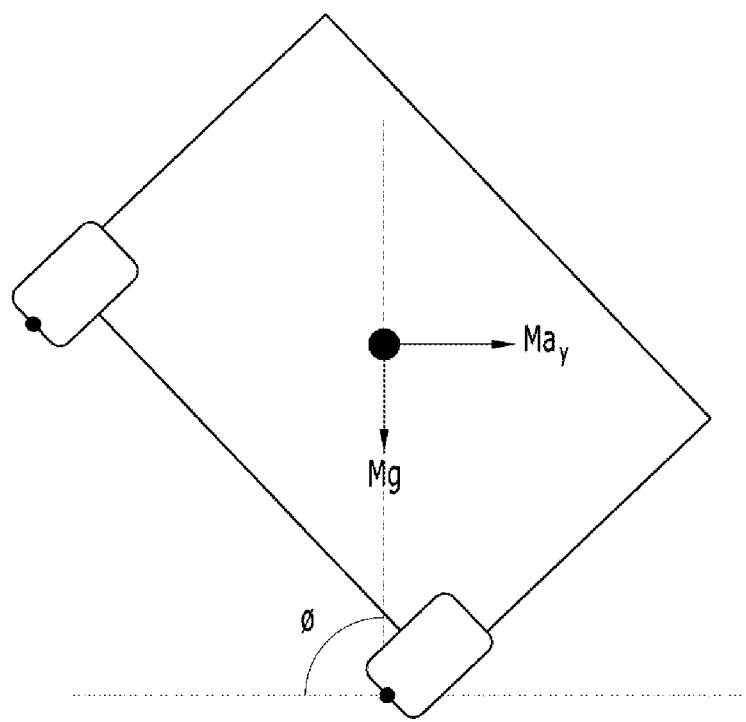

FIG. 4 shows a situation in which roll occurs in a clockwise direction as a lateral acceleration is applied to a right direction thereof, for example, a vehicle 100 suddenly turns to the left. Needless to say, restoring force is naturally generated according to a relationship between the rotation center and the center of gravity until a vehicle becomes in a state shown in FIG. 1D, but when a roll angle exceeds a threshold roll angle as shown in FIG. 1D, the vehicle rollovers as long as restoring force in a left direction (or a counterclockwise direction) is not generated.

Thus, according to an exemplary embodiment of the present invention, when a roll angle reaches or exceeds a threshold angle, a method of generating restoring force through acceleration and deceleration of an engine may be provided.

The method may use the law of conservation of angular momentum, in which case the law of conservation of angular momentum means that angular momentum is conserved as long as there is no external force and angular momentum is not changed by internal force. For example, when angular momentum is generated due to roll of a vehicle, to generate restoring force for offsetting this in an opposite direction thereof, another rotor inside a vehicle needs to be accelerated in a direction in which angular momentum due to roll is generated or another rotor needs to be decelerated in an opposite direction to the direction in which the angular momentum due to roll is generated. Thus, according to the exemplary embodiment of the present invention, when the engine 110 of a vehicle needs to be accelerated or decelerated to generate restoring force for offsetting angular momentum due to roll, it may be possible to prevent or alleviate rollover.

Figure 5:
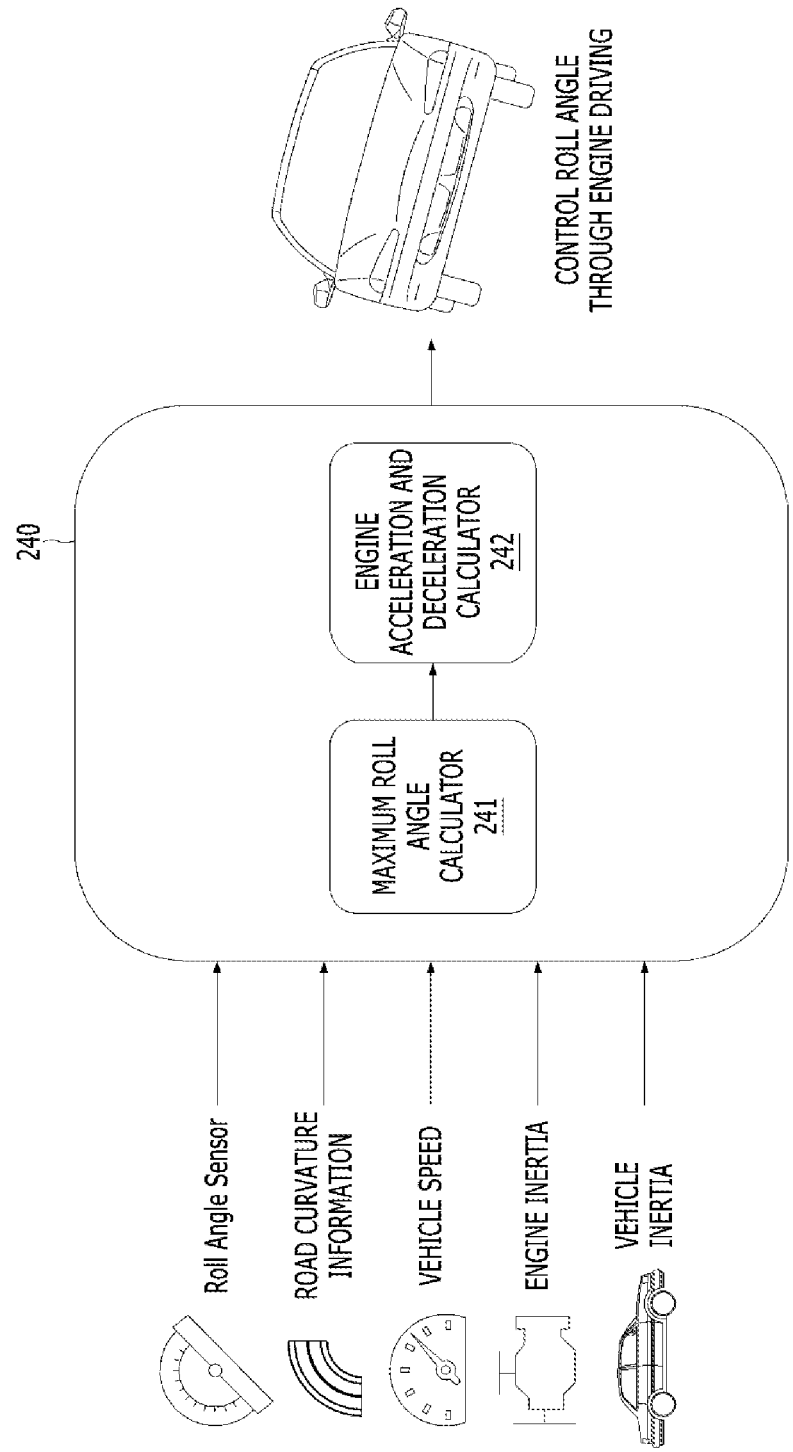
FIG. 5 is a block diagram showing an example of a configuration of a controller configured for performing anti-rollover control according to an exemplary embodiment of the present invention.

FIG. 5 is a block diagram showing an example of a configuration of a controller configured for performing anti-rollover control according to an exemplary embodiment of the present invention.

FIG. 5 shows a configuration of the HCU 240 as a controller configured for performing anti-rollover control according to an exemplary embodiment of the present invention. The HCU 240 according to an exemplary embodiment of the present invention may use roll angle information, road curvature information, vehicle speed, engine inertia, and vehicle inertia as an input value. Here, the roll angle information may be acquired from a roll angle sensor, the vehicle speed may be acquired from a vehicle speed sensor, and the road curvature information may be acquired from a navigation system, but the present invention is not limited thereto. Furthermore, the engine inertia and the vehicle inertia may be proportional to the mass of an engine and the mass of a vehicle and corresponding information corresponds to specification, and thus, each mass may be applied to a pre-stored value.

The HCU 240 may include a maximum roll angle calculator 241 and an engine acceleration and deceleration calculator 242. When a curved road is present forward of the vehicle, the maximum roll angle calculator 241 may compare a maximum roll angle which may be generated based on the road curvature and the vehicle speed with a threshold angle at which rollover occurs in a vehicle to determine the possibility that rollover occurs. In the instant case, as described above, the threshold angle may be related to the track width and the center of gravity, and each numeral except for the weight of a driver and the weight of loading corresponds to vehicle specification, and thus, a pre-input value is applied, but the present invention is not limited thereto.

When the maximum roll angle calculator 241 determines that the possibility of rollover is present, the engine acceleration and deceleration calculator 242 may determine an operation direction of an engine, a required acceleration and deceleration, and a previous control form based thereon to prevent rollover. For example, when an engine needs to be accelerated, previous control may be configured such that an engine RPM needs to be previously reduced, and when the engine needs to be decelerated, the previous control may be configured such that the engine RPM needs to be previously increased. The required acceleration and deceleration may be determined depending on restoring force required to prevent rollover at a point of a maximum roll angle or a time point when a roll angle sensor detects a threshold angle. Restoring force may be determined based on at least vehicle inertia and engine inertia. Previous control and engine acceleration and deceleration are accompanied by a change in engine speed, and thus, to prevent influence on drivability, the engine acceleration and deceleration calculator 242 may the clutch controller 230 to release the engine clutch 130 before previous control is performed, and may control the MCU 220 such that the driving motor 140 takes charge of driving power for satisfying required torque of a driver.

Hereinafter, operations of anti-rollover control will be described with reference to FIG. 6.

Figure 6:
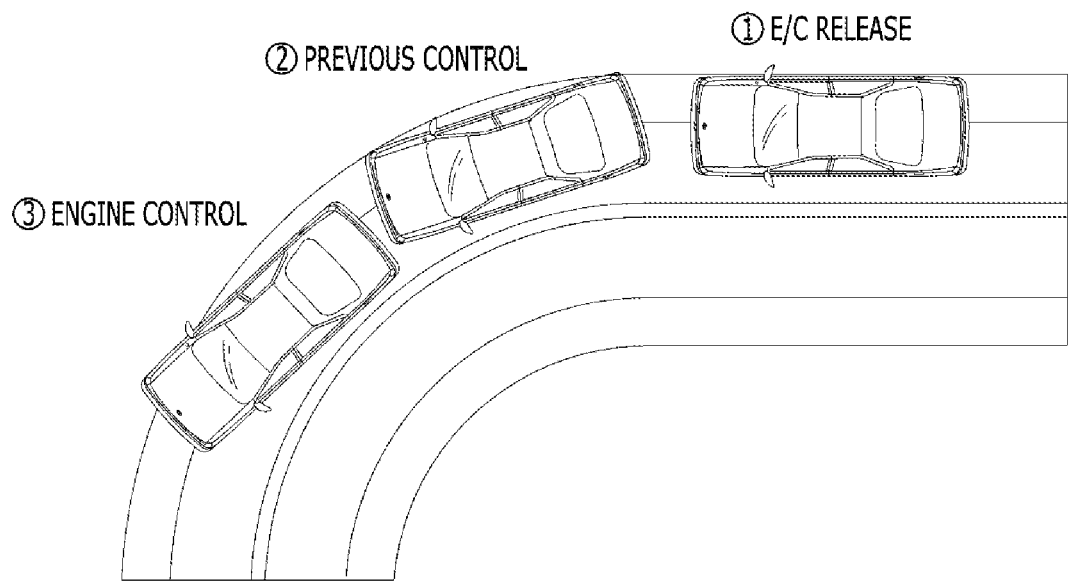
FIG. 6 is a diagram for explaining operations of anti-rollover control according to an exemplary embodiment of the present invention.

FIG. 6 is a diagram for explaining operations of anti-rollover control according to an exemplary embodiment of the present invention.

Referring to FIG. 6, when a curved road is present forward of the vehicle, if a maximum roll angle predicted at the corresponding curved road is equal to or greater than a threshold roll angle, the engine clutch 130 may first release the engine clutch 130 for anti-rollover control. Thus, an engine may be in a state in which revolutions per minute (RPM) thereof are configured for being controlled without influence on a vehicle speed, i.e., drivability. The engine clutch may be released before entry into the curved road, but the present invention is not limited thereto.

In the state in which the engine clutch is released, previous control for previously increasing or lowering RPM of the engine may be performed depending on whether the engine is accelerated or decelerated for alleviating rollover. The previous control operation may be performed after the engine clutch is released, and simultaneously, may be performed prior to a point at which a roll angle is equal to or greater than a threshold roll angle, and in more detail, may be performed prior to entry into the curved road. Furthermore, when an engine needs to be accelerated, RPM of the engine may be reduced to idle RPM when, and when the engine needs to be decelerated, the RPM of the engine may be increased to a starting point of a red zone, but the present invention is not limited thereto.

The previous control state may be maintained until a roll angle of the vehicle is equal to or greater than a threshold roll angle, and when a roll angle detected by a vehicle is equal to or greater than the threshold roll angle, an engine control operation of accelerating or decelerating the engine may be performed.

Hereinafter, a detailed form of anti-rollover control depending on arrangement of an engine will be described with reference to FIGS. 7 and 8.

Figure 7A:
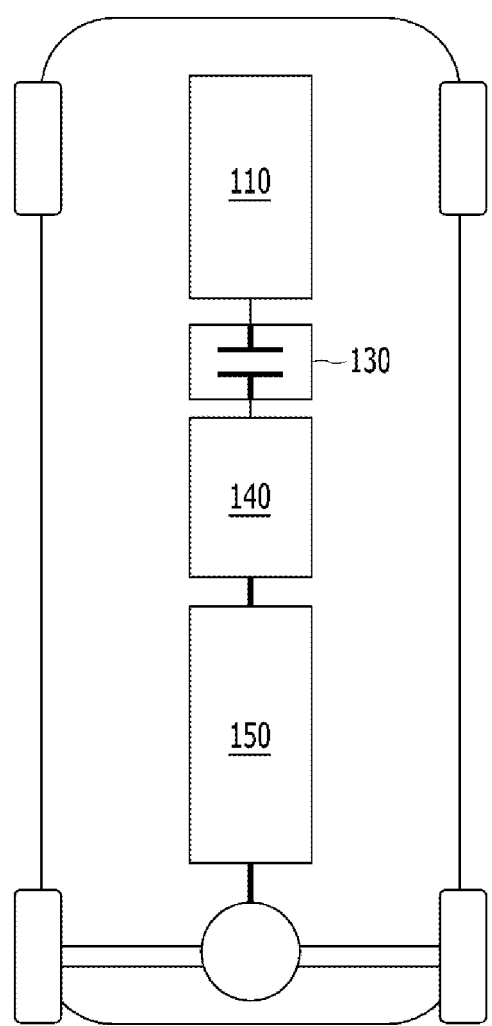
FIG. 7A and FIG. 7B are diagrams for explaining a form of anti-rollover control of a longitudinal mounting engine vehicle according to an exemplary embodiment of the present invention.
Figure 7B:
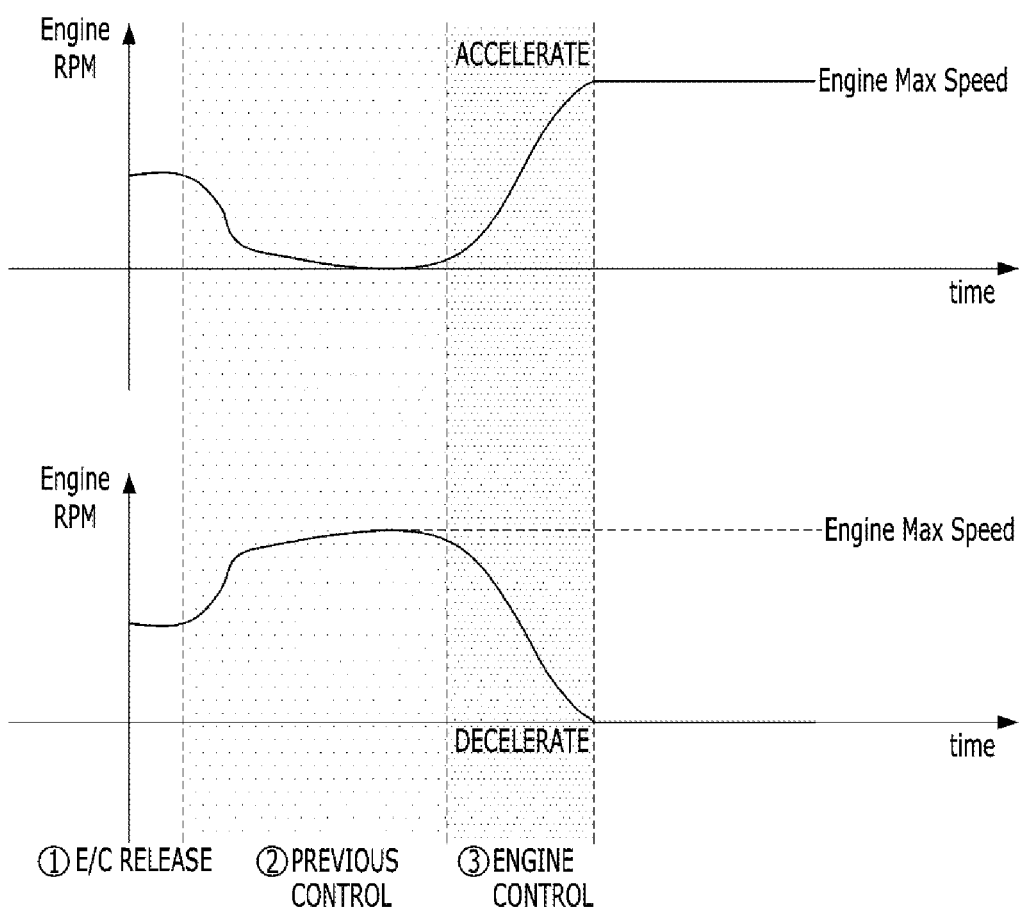

FIG. 7A and FIG. 7B are diagrams for explaining a form of anti-rollover control of a longitudinal mounting engine vehicle according to an exemplary embodiment of the present invention.

FIG. 7A shows an example of arrangement of a powertrain of a longitudinal mounting (or a vertical mounting) engine vehicle which is commonly applied in a rear wheel-drive vehicle. In such a vehicle, a direction of lateral acceleration that acts as restoring force may be determined depending on whether an engine is accelerated and decelerated. For example, assuming that an engine is rotated in a clockwise direction thereof, when a lateral acceleration is applied in a right direction thereof, if the engine is accelerated, restoring force may be generated in a left direction thereof. In contrast, when a lateral acceleration is applied in a left direction thereof, if the engine is decelerated, restoring force may be generated in a right direction thereof. A control form using the present principle is shown in FIG. 7B.

An upper portion of FIG. 7B shows a control form when an engine needs to be accelerated to alleviate rollover depending on an acceleration applied to a vehicle and a lower portion shows a control form when the engine needs to be decelerated to alleviate rollover.

First, when the engine needs to be accelerated, a state in which RPM of the engine is low may be maintained in a previous control operation after an engine clutch is released, and the current operation enters an engine control operation, the engine may be accelerated. When the engine needs to be decelerated, a state in which the RPM of the engine is high may be maintained in a previous control operation after the engine clutch is released, and the current operation enters the engine control operation, the engine may be decelerated. Here, a difference between an engine speed of the previous control operation and a last engine peed in the engine control operation in each situation and a control time of the engine control operation, that is, an acceleration/deceleration of the engine may be determined based on at least one of vehicle inertia, engine inertia, or a maximum roll angle, but the present invention is not limited thereto. Needless to say, with regard to control of acceleration, power of the HSG 120 may also be used if necessary.

Figure 8A:
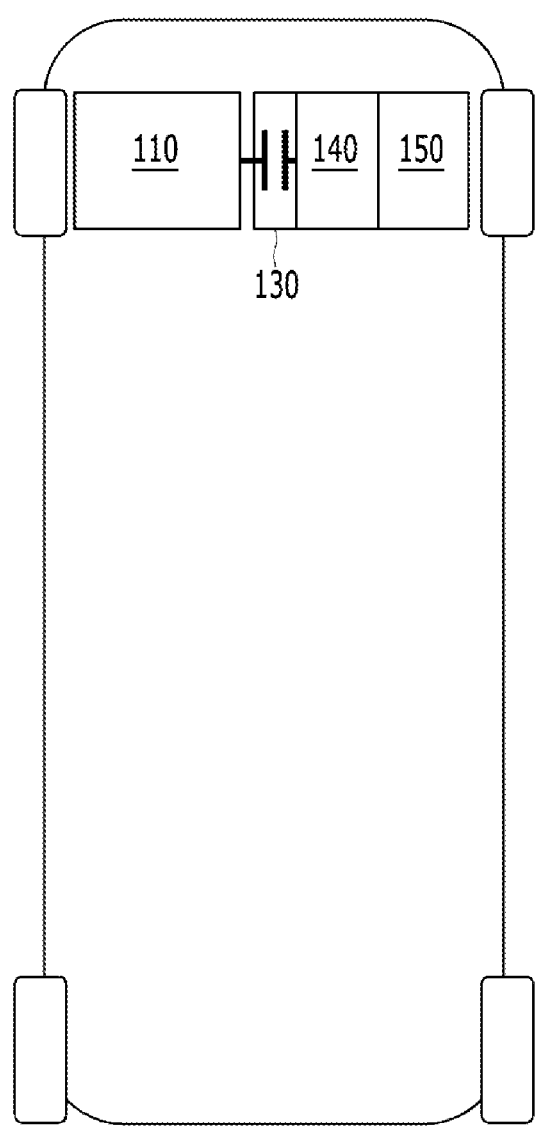
FIG. 8A and FIG. 8B are diagrams for explaining a form of anti-rollover control of a transverse mounting engine vehicle according to an exemplary embodiment of the present invention.
Figure 8B:
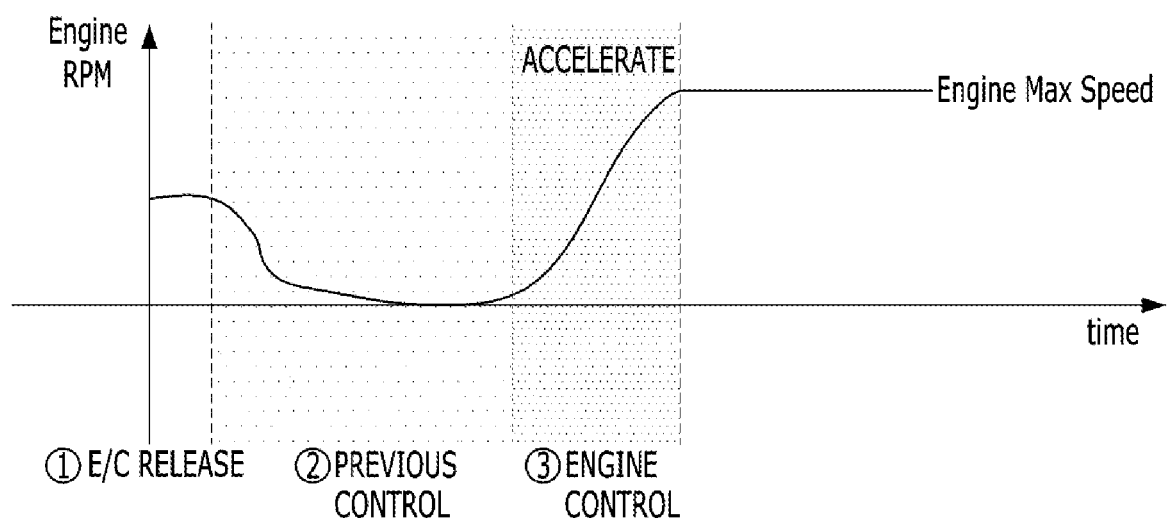

FIG. 8A and FIG. 8B are diagrams for explaining a form of anti-rollover control of a transverse mounting engine vehicle according to an exemplary embodiment of the present invention.

FIG. 8A shows an example of arrangement of a powertrain of a transverse mounting (or a horizontal mounting) engine vehicle which is commonly applied in a front wheel-drive vehicle. In such a vehicle, it is difficult to determine a direction of a lateral acceleration that acts as restoring force depending on whether the engine is accelerated or decelerated. Instead, it may be possible to move load forwards and backwards by applying a longitudinal acceleration. Although there is a slight difference depending on the characteristics of a suspension, in general, when a vehicle travels in a curved road, if the vehicle rollovers, one side of a front wheel may be raised off the ground and then a rear wheel at the corresponding side may be raised off. That is, when the front wheel is raised off the ground, the engine may be accelerated or decelerated to move load to a front side of the vehicle, alleviating rollover. Thus, as shown in FIG. 8B, assuming that a rotation direction of the engine is an opposite direction to a rotation direction of a rear wheel, as the engine is accelerated in the engine control operation, restoring force may be applied in a direction in which the front wheel is pressed.

Figure 9:
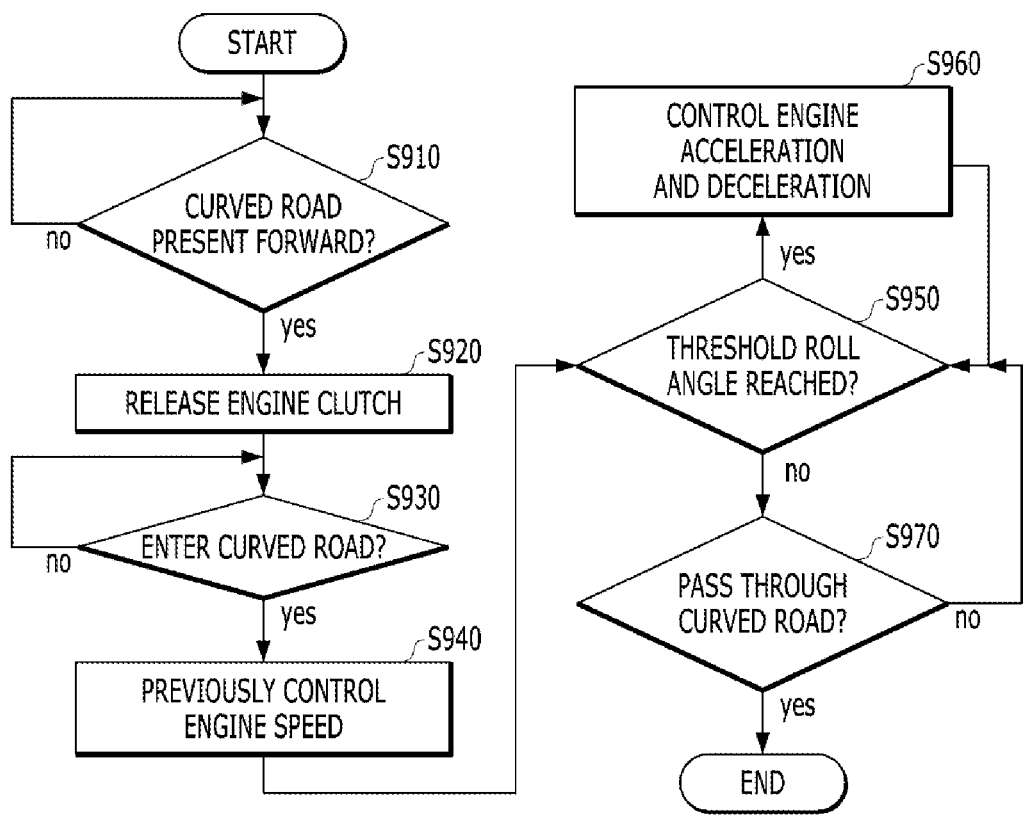
FIG. 9 is a flowchart showing an example of procedures of anti-rollover control according to an exemplary embodiment of the present invention.

A flowchart of the procedures of anti-rollover control according to the exemplary embodiment described thus far is shown in FIG. 9.

FIG. 9 is a flowchart showing an example of procedures of anti-rollover control according to an exemplary embodiment of the present invention.

Referring to FIG. 9, a hybrid controller may be configured to determine whether a curved road in which a maximum roll angle is predicted to be equal to or greater than a threshold roll angle is present forward based on map information and vehicle speed (S910). When the curved road in which the maximum roll angle is predicted to be equal to or greater than the threshold roll angle is present, the hybrid controller may be configured to control to release an engine clutch prior to entry into the curved road (S920). In the instant case, the hybrid controller may also determine whether the engine is accelerated or decelerated.

Accordingly, when a vehicle enters a curved road (S930), the hybrid controller may perform previous control of accelerating or decelerating the engine to maintain a corresponding state depending on acceleration or deceleration (S940). Needless to say, in various exemplary embodiments of the present invention, previous control may also be performed prior to entry into the curved road.

After entry into the curved road, the hybrid controller may monitor a roll angle of the vehicle, and when the roll angle of the vehicle reaches (or exceeds) a threshold roll angle (YES of S950), the engine may be accelerated or decelerated as previously determined (S960).

The monitoring operation S950 of the roll angle and the engine control operation S960 may be performed until the vehicle passes through the curved road (S970).

In the exemplary embodiments that have been described thus far, engine clutch release and previous control are previously performed depending on whether the curved road is present forward, but when a lateral acceleration is generated due to a road state or sudden steering, it is difficult to perform previous. In the instant case, the control procedure of FIG. 9 may be modified as shown in FIG. 10.

Figure 10:
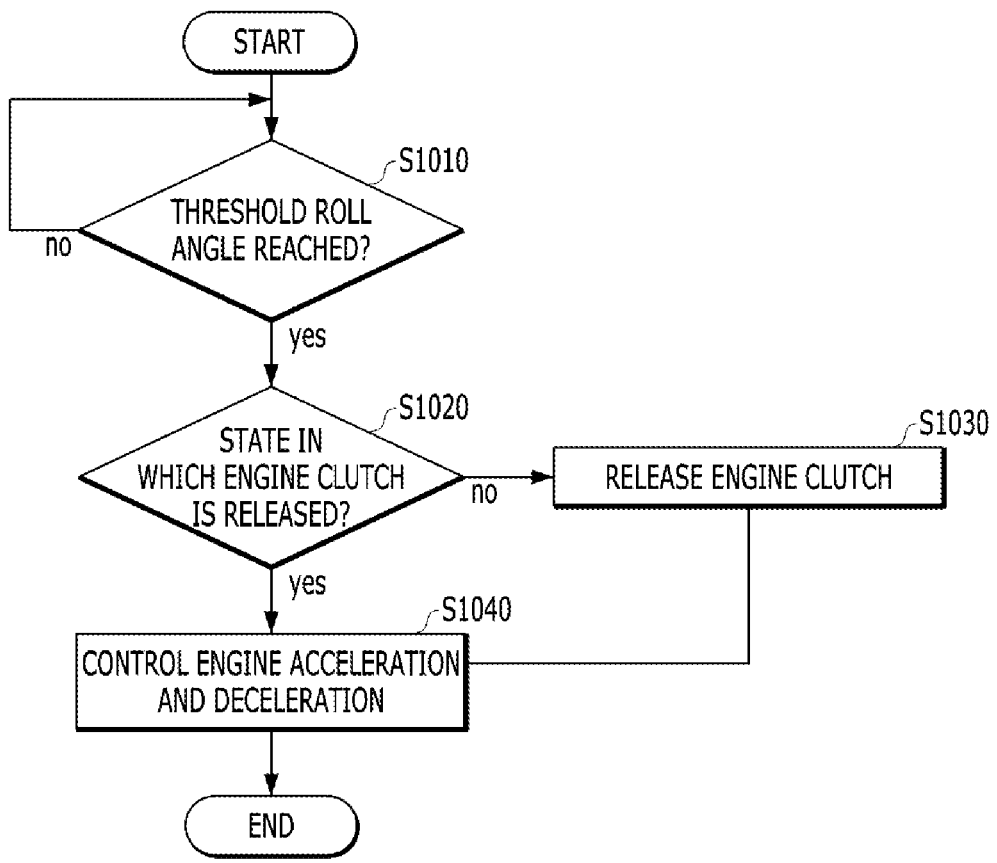
FIG. 10 is a flowchart showing an example of procedures of anti-rollover control according to various exemplary embodiments of the present invention.

FIG. 10 is a flowchart showing an example of procedures of anti-rollover control according to various exemplary embodiments of the present invention.

Referring to FIG. 10, even if previous control is not performed unlike in FIG. 9, when a threshold roll angle is reached by monitoring a roll angle (YES of S1010), the hybrid controller may check the state of an engine clutch (S1020), when the engine clutch is not released, the engine clutch may be immediately released (S1030), and accordingly, engine acceleration and deceleration control which is available in the current RPM may be performed (S1040). For example, when restoring force is generated when an engine is accelerated, that is, when an engine red zone is from 6500 RPM and the current RPM is 2000, the engine may be accelerated using an RPM difference corresponding to 4500 RPM.

In the aforementioned embodiments, although a vehicle assumed to be a hybrid vehicle has been described, embodiments of the present invention may also be modified and applied to a general internal combustion engine. In detail, in the aforementioned embodiments, although an engine clutch is released to separate an engine and a driveshaft, the engine and the driveshaft may be separated by conversion to stage N of a transmission in a general internal combustion engine. For example, in FIG. 9, the engine clutch release operation S920 may be replaced with conversion to stage N of a transmission. Needless to say, in the instant case, there is no element for applying driving force, such as a driving motor, unlike a hybrid vehicle, and thus, it may be possible to perform gear shifting after exit from a curved road, and thus, there is a limit in ensuring acceleration performance, but it may be possible to still alleviate rollover. Thus, the anti-rollover control may be restrictively applied in a situation in which the possibility of re-acceleration of a driver is low, for example, in a situation at a downhill road is low, but the present invention is not limited thereto.

In the aforementioned embodiments, information related to acceleration or deceleration control of an engine when a threshold roll angle is reached, or engine clutch release and previous control prior to such engine control may be displayed in a predetermined form on a display device included in a vehicle. For example, the display device may include a cluster, a display of a head unit, or a head-up display (HUD), but the present invention is not limited thereto. The information displayed on the display device may be output under control of the hybrid controller. An example of the displayed information may include at least one of a current roll angle, a threshold roll angle, a maximum roll angle of a front curved road, information on whether engine clutch release and previous control are performed by detecting that a front curved road is present, or information on whether acceleration and deceleration control of the engine is performed when a roll angle reaches a threshold roll angle.

The hybrid vehicle related to at least an exemplary embodiment of the present invention as configured above may enhance safety by alleviating rollover.

According to exemplary embodiments of the present invention, restoring force may be generated in a roll situation through control of an engine speed, and thus, it may be possible to alleviate rollover without separate hardware for preventing rollover.

It will be appreciated by persons skilled in the art that the effects that could be achieved with the present invention are not limited to what has been described hereinabove and other advantages of the present invention will be more clearly understood from the detailed description.

Furthermore, the term "controller" refers to a hardware device including a memory and a processor configured to execute one or more steps interpreted as an algorithm structure. The memory may be a non-transitory storage medium containing program instructions which store algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The present invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle in which an engine clutch is mounted between an engine and a driving motor, the method comprising:
   detecting a roll angle of the vehicle; and
   when the detected roll angle is equal to or greater than a threshold roll angle, accelerating or decelerating, by a controller, the engine in a state in which the engine clutch is released depending on a direction of the roll angle.

2. The method of claim 1, further including:
   when a curved road is present forward of the vehicle, controlling, by the controller, the engine clutch to be released prior to entry of the vehicle into the curved road.

3. The method of claim 2, wherein the controlling is performed when a maximum roll angle predicted in the curved road is determined by the controller to be equal to or greater than the threshold roll angle.

4. The method of claim 2, further including:
   when the engine is accelerated, reducing, by the controller, revolutions per minute (RPM) of the engine in a state in which the engine clutch is released prior to the accelerating or decelerating; or
   when the engine is decelerated, increasing, by the controller, the RPM of the engine in a state in which the engine clutch is released prior to the accelerating or decelerating.

5. The method of claim 4, further including:
   reducing or increasing the RPM of the engine, and then, maintaining the RPM until the detected roll angle reaches the threshold roll angle.

6. The method of claim 1, wherein, when the engine is a transverse mounting engine, the accelerating or decelerating is performed when one-side wheel of front wheels of the vehicle is raised off a ground.

7. The method of claim 1, wherein, when the engine is a longitudinal mounting engine, the accelerating or decelerating is performed to accelerate the engine when a rotation direction of the engine corresponds to a direction of the roll angle, and is performed to decelerate the engine when the rotation direction of the engine corresponds to an opposite direction to the direction of the roll angle.

8. The method of claim 1, wherein the accelerating or decelerating is performed in consideration of at least one of inertia of the vehicle or inertia of the engine.

9. The method of claim 1, wherein the threshold roll angle is determined in consideration of at least a track width of the vehicle and a height of a center portion of gravity.

10. A non-transitory computer readable medium on which a program for performing the control method of the vehicle of claim 1 is recorded.

11. A vehicle comprising:
an engine controller configured to control an engine of the vehicle;
a clutch controller configured to control an engine clutch mounted between the engine and a driving motor of the vehicle; and
a hybrid controller electrically connected to the engine controller and the clutch controller and configured to control the engine controller and the clutch controller,
wherein the hybrid controller is configured to detect a roll angle of the vehicle, and when the detected roll angle is equal to or greater than a threshold roll angle, the hybrid controller is configured to control the engine to accelerate or decelerate in a state in which the engine clutch is released depending on a direction of the roll angle.

12. The vehicle of claim 11, wherein, when a curved road is present forward of the vehicle, the hybrid controller is configured to control the engine clutch to be released prior to entry of the vehicle into the curved road.

13. The vehicle of claim 12, wherein the hybrid controller is configured to control the engine clutch to be released when a maximum roll angle predicted in the curved road is to be equal to or greater than the threshold roll angle.

14. The vehicle of claim 12, wherein, when the engine is accelerated, the hybrid controller is configured to perform control to reduce revolutions per minute (RPM) of the engine in a state in which the engine clutch is released, and when the engine is decelerated, the hybrid controller is configured to perform control to increase the RPM of the engine in a state in which the engine clutch is released.

15. The vehicle of claim 14, wherein the hybrid controller is configured to perform control to reduce or increase the RPM of the engine and then performs control to maintain the RPM until the detected roll angle is equal to or greater than the threshold roll angle.

16. The vehicle of claim 11, wherein, when the engine is a transverse mounting engine, the hybrid controller is configured to accelerate or to decelerate the engine when one-side wheel of front wheels of the vehicle is raised off a ground.

17. The vehicle of claim 11, wherein, when the engine is a longitudinal mounting engine, the hybrid controller is configured to accelerate the engine when a rotation direction of the engine corresponds to a direction of the roll angle, and the hybrid controller decelerates the engine when the rotation direction of the engine corresponds to an opposite direction to the direction of the roll angle.

18. The vehicle of claim 11, wherein the hybrid controller is configured to determine an acceleration of the engine when the engine is accelerated or decelerated, in consideration of at least one of inertia of the vehicle or inertia of the engine.

19. The vehicle of claim 11, wherein the threshold roll angle is determined in consideration of at least a track width of the vehicle and a height of a center portion of gravity.

20. The vehicle of claim 11, further including a display device,
wherein the hybrid controller is configured to perform control to display information in a state of acceleration or deceleration of the engine corresponding to the detected roll angle through the display device.

* * * * *